United States Patent [19]

Bakerman

[11] Patent Number: 5,453,897
[45] Date of Patent: Sep. 26, 1995

[54] INFORMATION STORAGE CARTRIDGE CONTAINING DESICCANT MATERIAL

[76] Inventor: Lawrence Bakerman, 8649 NW. 186th St., Suite 169, Miami, Fla. 33015

[21] Appl. No.: 231,502

[22] Filed: Apr. 22, 1994

[51] Int. Cl.$^6$ .................................................. G11B 23/02
[52] U.S. Cl. ........................................... 360/132; 360/133
[58] Field of Search .................................. 360/132, 133; 369/272

[56] References Cited

U.S. PATENT DOCUMENTS

| | | | |
|---|---|---|---|
| 4,959,976 | 10/1990 | Matsuda | 360/132 X |
| 5,189,581 | 2/1993 | Schroder | 360/137 |

*Primary Examiner*—A. J. Heinz
*Attorney, Agent, or Firm*—Malloy & Malloy

[57] ABSTRACT

An information storage cartridge to be utilized within an electronic device so as to record and/or store information, the cartridge including a housing with a hollow interior wherein an information storage medium is movably and protectively contained for access by the electronic device, the cartridge further including a desiccant material positioned within the hollow interior of the housing, the desiccant material being disposed in a position remote from the information storage medium and being adapted to remove moisture from within the hollow interior of the housing while not restricting the normal use of the information storage cartridge within an orifice of a corresponding electronic device.

6 Claims, 1 Drawing Sheet

INFORMATION STORAGE CARTRIDGE CONTAINING DESICCANT MATERIAL

BACKGROUND OF THE INVENTION

1. Field of the Invention

The present invention relates to an information storage cartridge to be used with an electronic device so as to record and/or store information thereon, the information storage cartridge having a longer life than conventional storage cartridges due to a decreased quantity of moisture maintained within the cartridge.

2. Description of the Related Art

Information storage cartridges are utilized in a variety of different mediums and accordingly have a variety of different uses and configurations. These varied uses include video cassettes, audio cassettes, computer disks, video game cartridges, film, or any other cartridge type storage apparatus. Generally, a user has a number of the information storage cartridges for use with a single electronic device, and accordingly, the information storage cartridges are stored until their use is required. Over time, however, the quality of the information stored within the information storage cartridge can deteriorate due to the environmental conditions regarding the location in which the information storage cartridge is maintained. In particular, the normal amounts of moisture contained within the air can significantly deteriorate the information storage medium contained within the cartridges over time. As a result, it would be highly beneficial to have an improved information storage cartridge which minimizes the quantities of moisture contained therein which affect the information storage medium contained by the cartridge.

Similar to the need to maintain the information storage medium within an information storage cartridge in a low moisture environment, it is beneficial to maintain the electronic device itself in a proper environment. Accordingly, devices such as that disclosed in the patent to Schroder, et al., U.S. Pat. No. 5,189,581 are provided. The device of Schroder specifically provides a dummy cartridge having a number of openings therein which are covered by a mesh-type material so as to contain a moisture absorbing material therein. The plurality of openings within the dummy cartridge are necessary to ensure that moisture is drawn from the electronic device to the dummy cartridge, thereby removing moisture from the electronic device. Further, such a device draws in large quantities of moisture and must therefore be replaced frequently. While such a device provides a better playing environment for a real information storage cartridge, it does not help to minimize the moisture which attacks the information storage medium within the information storage cartridge, nor does it protect the information storage cartridge when stored outside of the electronic device, as is most common. Accordingly, there is a need for an information storage cartridge which removes moisture from within itself to assist in the preservation of an information storage medium contained therein, both during use and storage within an electronic device as well as during storage outside of the electronic device. Further, such a device would assist in minimizing the quantities of moisture introduced to the electronic device by the information storage cartridge during use.

Applicant's invention is designed precisely to meet the needs which still remain in light of the related art. Specifically, applicant's device enables an information storage medium contained within an information storage cartridge to function normally within its necessary, contained cartridge environment, while also ensuring that moisture build-up within the contained cartridge is substantially minimized so as to extend the life of the information storage medium. Also, as it is not working to remove moisture from outside the cartridge, the moisture absorbing quality will be maintained during the life of the information storage medium within the cartridge.

SUMMARY OF THE INVENTION

The present invention is directed towards an information storage cartridge to be utilized within an electronic device so as to record and/or store information. In particular, the information storage cartridge includes a housing and an information storage medium adapted to record and/or store the information. Specifically, the housing is structured to be inserted into a corresponding orifice within the electronic device to permit subsequent storage and retrieval of information on the information storage medium. The housing includes a hollow interior wherein the information storage medium is movably and protectively contained, and access means which provide the electronic device with access to the hollow interior of the housing and accordingly the information storage medium contained within the hollow interior of the housing. Also securely disposed within the hollow interior of the housing is a desiccant material. The desiccant material is positioned in a position remote from the access means and the information storage medium so as to be non-obstructive and non-contacting to the access, movement, and positioning of the information storage medium within the hollow interior. The desiccant material is structured such that it absorbs moisture substantially from the hollow interior of the housing, thereby removing moisture from the cartridge for an extended period of time.

It is an object of the present invention to provide an information storage cartridge which has an extended lifespan due to minimization of moisture which directly affects an information storage medium of the information storage cartridge.

Still another object of the present invention is to provide an information storage cartridge which will have substantially reduced moisture quantities therein for an extended period of time due to the fact that excess moisture is drawn from within a hollow interior of the cartridge, rather than from the ambient air or electronic device exterior of the cartridge.

Still another object of the present invention is to provide an information storage cartridge which has substantially reduced moisture levels therein, thereby extending the life of the information storage cartridge, without effecting the functioning and quality of the information storage capabilities of the storage medium.

A further object of the present invention is to provide an information storage cartridge which has an extended life due to the reduction of moisture contained therein and which is easy and cost-effective to adapt for the moisture reduction.

BRIEF DESCRIPTION OF THE DRAWINGS

For a fuller understanding of the re of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Shown throughout FIGS. 1–6, the present invention is directed towards an information storage cartridge, generally indicated as 10. Specifically, the information storage cartridge 10 is of the type to be utilized within an electronic device so as to record and/or store information. As shown in the figures, the information storage cartridge 10 can be a video cassette (see FIG. 1), a video game cartridge 10' (see FIG. 3), or a computer disk cartridge 10", (see FIG. 5) These embodiments, however, are only illustrative of the numerous types of information storage cartridges 10 which could be effectively utilized. In fact, any type of information storage cartridge, such as audio cassettes, film, compact discs, distal audio tape, or any other type cartridge, which presently exists or is developed, that is inserted into an electronic device, is within the scope of the present invention.

Figure 1:
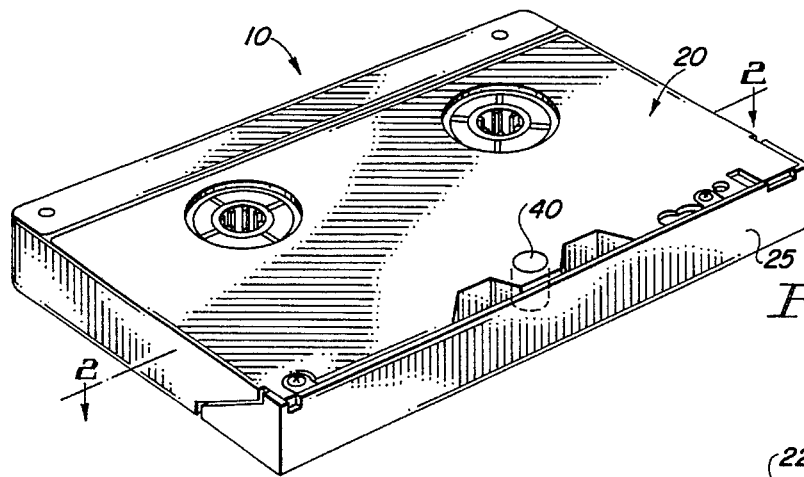
FIG. 1 is a perspective view of a first embodiment of the cartridge of the present invention.
Figure 3:
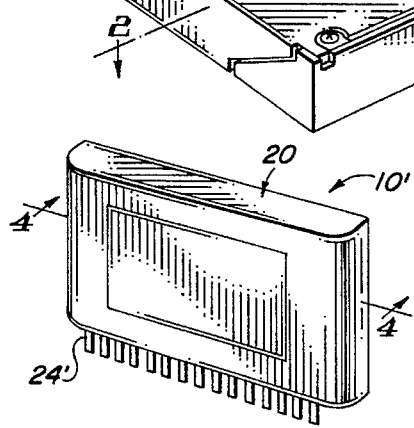
FIG. 3 is a perspective view of a second embodiment of the cartridge of the present invention.
Figure 2:
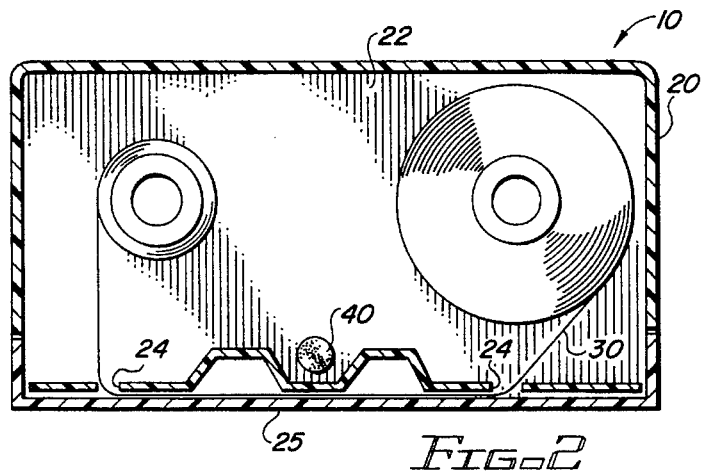
FIG. 2 is a cross-sectional view along line 2—2 of FIG. 1.
Figure 4:
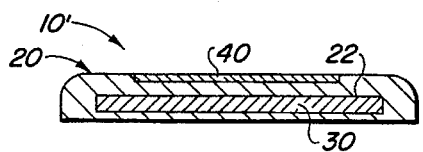
FIG. 4 is a cross-sectional view along line 4—4 of FIG. 3.
Figure 5:
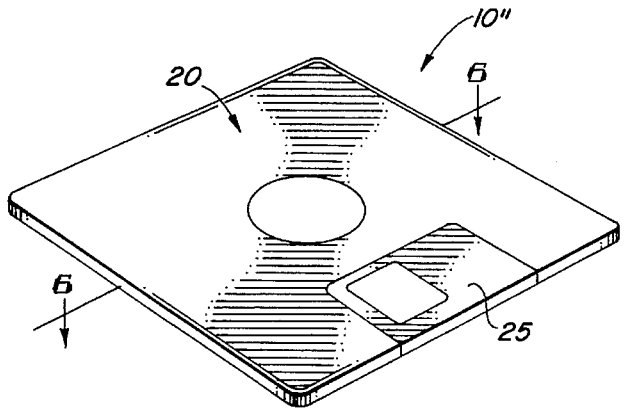
FIG. 5 is a perspective view of a third embodiment of the cartridge of the present invention.
Figure 6:
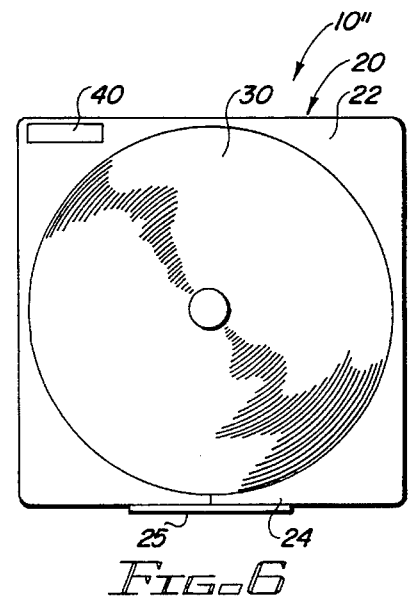
FIG. 6 is a cross-sectional view along line 6—6 of FIG. 5.

Turning to the embodiments illustrated throughout the drawings, the information storage cartridge 10 includes primarily a housing 20. This housing 20 is sized as a conventional type information storage cartridge for use with a particular electronic device and is accordingly structured to be inserted into a corresponding orifice within the electronic device. The housing 20 includes a hollow interior 22 wherein an information storage medium 30 is contained. Specifically, the information storage medium 30 corresponds the electronic device within which the cartridge 10 is utilized, and accordingly, may be a video tape, as illustrated in FIG. 2, an array of circuitry and computer chips as utilized in a particular video game, as illustrated in FIG. 4, or a computer disk, as utilized in a floppy disk, as illustrated in FIG. 6. The information storage medium 30 is movably and protectively contained within the hollow interior 22 of the housing 20 and is accessible to an exterior of the housing 20 through access means 24 formed in the housing 20. Specifically, the access means 24 provide the electronic device with access to the hollow interior 22 of the housing 20, and accordingly, to the information storage medium 30. Generally, the access means 24 is in the form of an opening or exposed portion as is commonly employed and utilized with various types of information storage cartridges. Further, the access means can also include a movable shield 25, as is commonly utilized with video cassettes 10 and computer disks 10". The shield 25 is adapted to be moved during use so as to expose the hollow interior 22 of the housing 20, and accordingly, the information storage medium 30 contained therein.

Finally, included within the hollow interior 22 of the housing 20 is a desiccant material 40. This desiccant material 40 is secured within the hollow interior 22 of the housing 20 in a position remote from the access means 24 and from the information storage medium 30. Accordingly, the desiccant material is positioned such that it will not obstruct, contact, or otherwise affect the access, movement and position of the information storage medium 30 within the hollow interior 22 of the housing 20. In such a manner, the desiccant material 40 will absorb moisture primarily from the hollow interior 22 of the housing 20 so as to provide an improved environmental condition within the housing 20, and accordingly, increase the duration and effective use of the information storage medium 30 contained within the housing 20. It is important that the desiccant material 40 be disposed remote from the information storage medium 30 such that the information storage cartridge 10 can function as normally and will not effect normal operation of the electronic device when an information storage cartridge 10 of the present invention is utilized. Further, since the desiccant material 40 is disposed to collect moisture from the hollow interior 22 of the housing 20, a small quantity will be able to absorb moisture for an extended period of time, as it is not working to absorb moisture from the ambient air outside of the housing 20 or from an interior of the electronic device within which the housing 20 is placed. In this manner, whether the information storage cartridge 10 is stored within an electronic device or merely on a shelf, the moisture build up within the housing 20 will be minimized so as to extend the life of the information storage medium 30 contained therein. Also, the desiccant material 40 can be disposed within the housing 20, or the housing 20 can be adapted, so that the desiccant material 40 is removable for replacement after extended use. Specifically, the desiccant material 40 can be any type of material which will absorb moisture from moisture humid air, however, the preferred embodiment includes silica gel in granular or particle form. Further, the silica gel is preferably contained in a small pouch or bundle within the hollow interior 22 of the housing 20 so as to assure that its secured location within the housing 20 is maintained, while ensuring that the silica gel is exposed for maximum absorbing potential.

Now that the invention has been described,

What is claimed is:

1. To be utilized with an electronic device so as to record and/or store audio and/or visual information, an enhanced preservation, audio and/or visual information storage cartridge comprising:

a housing, said housing being structured to be inserted into a corresponding orifice within the electronic device, said housing including a hollow interior and access means structured and disposed to provide the electronic device with access to said hollow interior of said housing, an audio and/or visual information storage medium, corresponding to the electronic device, said information storage medium being functionally disposed within said hollow interior of said housing so as to be movably and protectively contained therein for effective, normal use with the electronic device, said information storage medium being structured and disposed to be accessed by the electronic device through said access means in said housing such that the electronic device can record or retrieve information on said information storage medium, and a desiccant material securably disposed within said hollow interior of said housing in a position remote from said access means and said information storage medium so as to be non-obstructive and non-contacting to the access, movement, and positioning of said information storage medium within said hollow interior, said desiccant material being structured and disposed to absorb moisture from within said hollow interior of said housing before, during and after the electronic device records or retrieves said information on said information storage medium.

2. An information storage cartridge as recited in claim 1 wherein said desiccant material is silica gel.

3. An information storage cartridge as recited in claim 2 wherein the information storage medium is videotape.

4. An information storage cartridge as recited in claim 2 wherein said information storage medium is a computer disk.

5. An information storage cartridge as recited in claim 2 wherein said information storage medium is an audio cassette.

6. An information storage cartridge as recited in claim 2 wherein said information storage medium is photographic film.

* * * * *